(12) United States Patent
Radici

(10) Patent No.: US 12,057,002 B2
(45) Date of Patent: Aug. 6, 2024

(54) ANTI-ABANDONMENT SYSTEM AND METHOD IN A VEHICLE

(71) Applicant: ERD IMPIANTI DI RADICI DIEGO, Villongo (IT)

(72) Inventor: Diego Radici, Villongo (IT)

(73) Assignee: ERD IMPIANTI DI RADICI DIEGO (IT)

( * ) Notice: Subject to any disclaimer, the term of this patent is extended or adjusted under 35 U.S.C. 154(b) by 130 days.

(21) Appl. No.: 17/759,192

(22) PCT Filed: Feb. 2, 2021

(86) PCT No.: PCT/IT2021/050026
§ 371 (c)(1),
(2) Date: Jul. 21, 2022

(87) PCT Pub. No.: WO2021/161353
PCT Pub. Date: Aug. 19, 2021

(65) Prior Publication Data
US 2023/0070079 A1 Mar. 9, 2023

(30) Foreign Application Priority Data
Feb. 10, 2020 (IT) .................... 102020000002593

(51) Int. Cl.
*G08B 21/22* (2006.01)
*G06V 10/74* (2022.01)
(Continued)

(52) U.S. Cl.
CPC .......... *G08B 21/22* (2013.01); *G06V 10/751* (2022.01); *G06V 10/761* (2022.01); *G06V 20/59* (2022.01); *G08B 21/24* (2013.01)

(58) Field of Classification Search
CPC ...... G08B 21/24; G08B 21/22; G06V 10/751; G06V 10/761; G06V 20/59
See application file for complete search history.

(56) References Cited

U.S. PATENT DOCUMENTS

| | | | |
|---|---|---|---|
| 2009/0200469 A1 | 8/2009 | Morin et al. | |
| 2014/0093133 A1* | 4/2014 | Frank | B60R 21/015 |
| | | | 382/104 |

(Continued)

FOREIGN PATENT DOCUMENTS

| | | |
|---|---|---|
| CN | 102259629 A | 11/2011 |
| CN | 106904063 A | 6/2017 |

(Continued)

OTHER PUBLICATIONS

Banner M12 Class 1 Laser Emitter, 53808 Rev. C, Oct. 25, 2017 (Year: 2017).*

*Primary Examiner* — John R Schnurr

(57) ABSTRACT

Anti-abandonment system (99) in a vehicle (100), comprising:
  at least one laser sensor (1a; 1b) structured for detecting a movement in the vehicle (100) by emission of a laser beam and measurement of a respective time of flight;
  at least one camera sensor (2a; 2b) structured for detecting a movement in the vehicle (100);
  a command-and-control unit (3) operatively connected to the at least one laser sensor (1a; 1b) for receiving a first detection signal representative of the movement detected by the at least one laser sensor (1a; 1b) and to the at least one camera sensor (2a; 2b) for receiving a second detection signal representative of the movement detected by the at least one camera sensor (2a; 2b), the command-and-control unit (3) being configured and programmed for:
    processing the first and second detection signal for verifying an achievement of a respective alarm condition;
    provided the achievement of the respective alarm condition for both the first and second detection signal, sending a respective command signal to at least one
(Continued)

between an alarm system (8; 9; 10; 11; 13) and an emergency system (15; 16; 17) mounted on the vehicle (100).

11 Claims, 2 Drawing Sheets

(51) Int. Cl.
*G06V 10/75* (2022.01)
*G06V 20/59* (2022.01)
*G08B 21/24* (2006.01)

(56) References Cited

U.S. PATENT DOCUMENTS

| | | | | |
|---|---|---|---|---|
| 2016/0249191 | A1* | 8/2016 | Avrahami | H04L 67/12 |
| 2017/0116839 | A1* | 4/2017 | Friedman | G08B 21/24 |
| 2020/0005625 | A1* | 1/2020 | Conner | G01K 3/005 |
| 2021/0295069 | A1* | 9/2021 | Toth | B60R 11/04 |
| 2023/0031129 | A1* | 2/2023 | Konstantinovsky | G08B 21/24 |

FOREIGN PATENT DOCUMENTS

| | | |
|---|---|---|
| CN | 206367458 U | 8/2017 |
| CN | 107139877 A | 9/2017 |
| CN | 105185030 B | 5/2018 |
| CN | 109398302 A | 3/2019 |
| DE | 102015015671 A1 | 7/2016 |
| EP | 3009282 A1 | 4/2016 |
| EP | 3182704 A1 | 6/2017 |
| JP | 2000289459 A | 10/2000 |
| JP | 2006159939 A | 6/2006 |
| KR | 101800613 B | 11/2017 |
| WO | WO2018165036 A1 | 9/2018 |

* cited by examiner

ANTI-ABANDONMENT SYSTEM AND METHOD IN A VEHICLE

TECHNICAL FIELD OF THE INVENTION

The present invention relates to an anti-abandonment system and an anti-abandonment method in a vehicle.

STATE OF THE ART

The danger deriving from leaving pets and/or passengers, such as children, infants or elderly and/or infirm, unattended in a vehicle is known.

This can entail a high risk for the health of the aforesaid passengers and/or animals, since inside the vehicle a rise in the temperature (typically in summer days) and/or a lowering of the oxygen level can typically occur such as to cause for example the fainting and/or the dehydration and/or even the death of the aforesaid passengers and/or animals abandoned in the vehicle.

Documents CN105185030A, KR101800613A, JP2006159939A, WO2018165036A1, CN102259629A and JP2000289459A describe known anti-abandonment systems in a vehicle, and related methods.

SUMMARY OF THE INVENTION

The Applicant has found that the known anti-abandonment systems in a vehicle have some drawbacks and/or can be improved in one or more aspects.

In particular, the Applicant believes that the known anti-abandonment systems in a vehicle are subject to a low reliability of detection of the presence of abandoned people and/or animals, for example they can generate false alarms about the presence of a forgotten passenger or an animal in the vehicle.

For example, as described in the documents CN105185030A, KR101800613A and JP2006159939A, it is known detecting the presence of a passenger (or an animal) through the use of an infrared device positioned inside the vehicle, which detects a possible movement of the passenger (or of the animal) mistakenly left in the vehicle.

A device (e.g., a camera or a sensor) using infrared technology detects the variations of infrared radiation incident on it, which are dependent on the temperature and on the surface characteristics of the object (e.g., a person or an animal) present in the detection field of the device.

According to the Applicant, the use of the aforesaid infrared technology for detecting a movement inside the vehicle can be influenced for example by the temperature conditions inside the vehicle and/or by the external light conditions and/or by the weather conditions (clouds passage, etc), as these can cause a variation of the infrared radiation incident on the device, determining the possibility that false alarms are generated about the presence of a passenger or an animal in the vehicle.

Other known anti-abandonment systems, such as those described in documents CN102259629A and JP2000289459A, detect the presence of a passenger (or an animal) through the use of a pressure sensor, for example placed under the seats or placed on the back part of the front seats of the vehicle so that it can be easily activated. Typically, a pressure sensor is an electronic component used for measuring a force applied to an object (e.g., the seat and/or the child seat) by measuring an electrical signal that varies due to the deformation that this force produces on the sensor. According to the Applicant, even the use of pressure sensors can determine the possibility that false alarms are generated, since the presence of forgotten objects on the seat could determine the activation of the pressure sensor.

Some of the known anti-abandonment systems, such as for example described in CN105185030A, WO2018165036A1 and CN102259629A, comprise other types of sensors that cooperate with the aforesaid infrared devices and/or pressure sensors, such as for example acoustic sensors, which however, according to the Applicant, do not provide a significant benefit to the overall reliability of the system.

The Applicant has therefore faced the problem of making an anti-abandonment system in a vehicle, and a method which uses said system that is highly reliable, for example not subject to false alarms when detecting the abandonment of a passenger and/or an animal in the vehicle.

According to an aspect the invention relates to an anti-abandonment system in a vehicle.

The anti-abandonment system comprises:

at least one laser sensor structured for detecting a movement in the vehicle by emission of a laser beam and measurement of a respective time of flight;

at least one camera sensor structured for detecting a movement in the vehicle;

a command-and-control unit operatively connected to said at least one laser sensor for receiving a first detection signal representative of said movement detected by the at least one laser sensor and to said at least one camera sensor for receiving a second detection signal representative of said movement detected by the at least one camera sensor, the command-and-control unit being configured and programmed for:

processing said first and second detection signal for verifying an achievement of a respective alarm condition;

provided the achievement of the respective alarm condition for both said first and second detection signal, sending a respective command signal to at least one between an alarm system and an emergency system mounted on said vehicle.

According to an aspect the invention relates to an anti-abandonment method in a vehicle.

The anti-abandonment method comprises:

activating at least one laser sensor and at least one camera sensor placed in said vehicle;

detecting a movement in the vehicle by means of said camera sensor and by emission of a laser beam and measurement of a respective time of flight by said at least one laser sensor;

generating a first detection signal representative of said movement detected by the at least one laser sensor;

generating a second detection signal representative of said movement detected by the at least one camera sensor;

processing said first and second detection signal for verifying an achievement of a respective alarm condition;

provided the achievement of the respective alarm condition for both said first and second detection signal, sending a respective command signal to at least one between an alarm system and an emergency system mounted on said vehicle.

According to the Applicant, the use of a laser sensor structured for detecting a movement in the vehicle by emission of a laser beam and measurement of a respective time of flight allows to obtain a reliable detection of the movement of a possible passenger or animal abandoned in a vehicle, since the laser technology is not influenced by any variations of temperature inside the vehicle and/or by outer light conditions and/or by the weather conditions, as well as not being influenced by the characteristics of the object which has to be detected, such as for example shape, colour and reflectivity.

In fact, the laser technology is based on the analysis of the time of flight (TOF), i.e., the measurement of the time interval between the emission instant of a laser beam and the reception instant of the beam reflected by the objective object. In this way it is typically possible measuring with high precision the distance of the object from the sensor and possible variations of the distance as a result of movement.

Furthermore, according to the Applicant, the determination of an alarm situation when both the first and second detection signals, respectively generated by the laser sensor and by the camera sensor, verify the respective alarm condition allows making a double check on the actual presence of an abandoned passenger and/or animal, reducing, if not cancelling, the possibility that false alarms are generated. For example, if an insect of significant size enters the detection field of the camera sensor (e.g., the insect lands on the objective of the camera sensor), it remains outside the detection field of the laser sensor (which is distinct from the camera sensor). In this situation, the system does not determine the aforesaid alarm condition for both the sensors, avoiding that a false alarm is generated.

Finally, the two sensors used (laser sensor and camera sensor) are advantageously based on different detection technologies, thus reducing the probability of a false alarm for both the sensors, as well as providing the system with highly sensitive instruments in the detection of the movement in the vehicle.

The present invention in one or more of the aforesaid aspects has one or more of the following preferred features.

Preferably said at least one, more preferably each one, camera sensor comprises a camera, more preferably an IP (Internet Protocol) camera, structured for acquiring images of an interior of the vehicle. In this way it is possible providing the anti-abandonment system with numerous advantages such as two-way audio that allows the passenger to be contacted directly via the camera, ease of installation of the camera and/or the possibility of remotely accessing the camera, i.e., live viewing the images shot by the camera through a device such as a mobile phone, computer and/or tablet.

Preferably said camera has a resolution greater than or equal to 2 mega pixels, and/or less than or equal to 8 mega pixels, more preferably less than or equal to 4 mega pixels. In this way it is possible providing a high resolution to the camera while keeping low the costs of the camera itself.

Preferably said at least one, more preferably each one, camera sensor comprises a processing unit programmed for processing said images and for detecting said movement in the interior of the vehicle by comparison between said images acquired at different time instants (e.g., by a "motion detection"-type software).

Preferably said alarm condition for said second detection signal verifies when two subsequent images of said images differ from each other by a pixels percentage greater than or equal to a threshold value (e.g., 1%).

Preferably said camera comprises an objective lens and a sensor (e.g., CCD or CMOS).

With terms "luminous", "light", "visible" and the like, reference is made to a portion of electromagnetic spectrum comprised in the optical spectrum, i.e., greater than or equal 380 nm and less than or equal to 780 nm.

With term "infrared" reference is made to a portion of electromagnetic spectrum comprised in the near-infrared, for example greater than or equal 780 nm and less than or equal to 1400 nm.

Preferably said sensor is sensitive to an optical radiation. In this way it is possible allowing the operation of the camera in visible light conditions.

Preferably said sensor is sensitive to an infrared radiation. In this way it is possible allowing the operation of the camera also in low light conditions.

Preferably said at least one, more preferably each one, camera sensor comprises a cut-off filter for the infrared radiation.

Preferably said cut-off filter for the infrared radiation is alternatively configurable in an activation configuration in which it prevents an irradiation of said sensor by the infrared radiation captured by the objective lens, and in an inactivation configuration in which it allows said irradiation of said sensor.

In this way it is possible quickly changing the operation mode of the camera sensor between the day and night detection mode. In fact, in daylight conditions (e.g., light intensity greater than or equal to 20 lux), the cut-off filter for the infrared radiation filter blocks the infrared radiation emitted from the environment and allows a clear detection of the images inside the vehicle. When the light falls below the daylight threshold (below 20 lux), the cut-off filter for the infrared radiation is configured to allow infrared radiation to incise on the camera sensor and allow clear detection of the images inside the vehicle even in low light conditions.

In one embodiment, said at least one, more preferably each one, camera sensor comprises an optical light intensifier. In this way, it is possible providing an efficient night vision system that allows obtaining images with high resolution. In fact, the operation of a light intensifier is based on the detection of the light (optical radiation) coming from the environment at very low intensity (e.g., moonlight, starlight or artificial light) and on its electronic amplification, so as to create an image with amplified brightness similar to the one had in daylight conditions.

In one embodiment, said at least one, more preferably each one, camera sensor comprises an infrared radiation source (to allow the operation even in total absence of optical and infrared radiation), more preferably activable provided that said cut-off filter is in the deactivation configuration.

Preferably said at least one laser sensor is placed at a roof of the vehicle.

Preferably said at least one camera sensor is placed at said roof of the vehicle, more preferably next to said at least one laser sensor.

Preferably said anti-abandonment system comprises two laser sensors, more preferably two and no more than two laser sensors.

Preferably one of said two laser sensors is placed at a front portion of the roof of the vehicle (e.g., at the front seats of the vehicle) and the other of said two laser sensors is placed at a central portion of the roof of the vehicle (e.g., at the back seats of the vehicle).

Preferably said anti-abandonment system comprises two camera sensors, more preferably two and no more than two camera sensors.

Preferably said two camera sensors are respectively placed next to a respective of said two laser sensors.

In this way, it is possible effectively covering the whole volume of the vehicle so that the presence of a passenger (or animal) abandoned in the vehicle can be reliably detected.

Preferably said command-and-control unit is separately connected to each of said two laser sensors for receiving a respective first detection signal representative of said movement detected by said two laser sensors and to each of said two camera sensors for receiving a respective second detection signal representative of said movement detected by said two camera sensors. In this way, it is possible detecting the movement of any passenger or animal abandoned in the vehicle separately for the front and back seats of the vehicle, in order to increase the overall system reliability.

Preferably said at least one laser sensor, preferably each laser sensor, emits a class 1 laser beam. In this way the laser sensor emits a safe laser beam for the passenger on board, avoiding causing, for example visual and/or skin, damage to any passenger or animal abandoned in the vehicle.

Preferably said at least one laser sensor, preferably each laser sensor, has an operating temperature greater than or equal to −30° C. and/or less than or equal to 80° C. In this way it is possible guaranteeing the operation of the laser sensor in a wide temperatures range that may occur inside the vehicle.

Preferably said anti-abandonment system comprises said alarm system operatively connected to said command-and-control unit for receiving said respective command signal.

Preferably, provided the achievement of the respective alarm condition for both said first and second detection signal, it is provided sending said respective command signal to said alarm system.

In this way, it is possible activating the alarm system in such a way as to warn of the alarm situation in progress in the vehicle.

Preferably said alarm system is structured for emitting an alarm signal as a function of said receiving said respective command signal.

Preferably, subsequently to said sending said respective command signal to said alarm, it is provided emitting an alarm signal by the alarm system.

In this way it is possible warning the driver of the vehicle and/or the people nearby the vehicle and/or one or more selected users (e.g., law enforcement or firefighters) of the alarm situation in the vehicle.

Preferably said alarm system comprises a smoke bomb, more preferably placed at a rear part of the vehicle, even more preferably next to the exhaust pipe of the vehicle, and said alarm signal comprises coloured smoke. In this way, an effective visual alarm is set up for drawing the attention of people nearby the vehicle.

Preferably said alarm system comprises a telecommunication module (for example a GSM or UMTS or LTE or WiMAX module) and said alarm signal comprises a, textual and/or graphic and/or vocal, digital message (e.g., an SMS and/or a phone call and/or an email) sent to one or more receiving devices (e.g., cell phone, computer and/or tablet) by said telecommunication module. In this way, it is possible warning the vehicle owner and/or other selected users (e.g., law enforcement and/or firefighters) of the alarm situation in the vehicle.

Preferably said telecommunication module is integrated in said command-and-control unit. In this way the structure of the anti-abandonment system is simplified.

Preferably said alarm system comprises a horn and/or a light device (e.g., light, indicators, etc.) of said vehicle and said alarm signal comprises respectively an acoustic signal emitted by said horn and/or a light signal emitted by said light device (e.g., a flashing of the light). In this way it is possible drawing the attention of the people nearby the vehicle.

Preferably said alarm system comprises a vocal amplification system (e.g., an amplification box of small dimension) and said alarm signal comprises a vocal message (e.g., which uses the same text send by the digital warning message) emitted by said vocal amplification system. In this way it is possible effectively drawing the attention of people nearby the vehicle, since the voice message which warns of the presence of a passenger (or animal) abandoned in the vehicle is unlikely to be ignored and/or confused for a malfunctioning of the vehicle by people nearby the vehicle.

Preferably said alarm system comprises two or more among, more preferably all, said smoke bomb, telecommunication module, vocal amplification system, horn and/or a light device.

Preferably said anti-abandonment system comprises a temperature sensor structured for continuously detecting an inner temperature of the vehicle. In this way it is possible using the measured value of inner temperature of the vehicle for the purpose of the anti-abandonment procedure.

Preferably said temperature sensor is integrated in said command-and-control unit. In this way the structure of the anti-abandonment system is simplified.

Preferably said command-and-control unit is operatively connected to said temperature sensor for receiving a temperature signal representative of said inner temperature of the vehicle.

Preferably it is provided continuously detecting an inner temperature of the vehicle and generating a temperature signal representative of said inner temperature of the vehicle.

Preferably, provided the achievement of the respective alarm condition for both said first and second detection signal, the command-and-control unit is configured and programmed for comparing said temperature signal with a threshold value of the temperature.

Preferably, provided the achievement of the respective alarm condition for both said first and second detection signal, it is provide comparing said temperature signal with a threshold value of the temperature.

Preferably said anti-abandonment system comprises said emergency system operatively connected to said command-and-control unit for receiving said respective command signal.

Preferably, provided the achievement of the respective alarm condition for both said first and second detection signal, it is provided sending said respective command signal to said emergency system.

Preferably said emergency system is structured for carrying out an emergency operation as a function of said receiving said respective command signal and as a function of said inner temperature of the vehicle.

Preferably subsequently to said sending said respective command signal to said emergency system and as a function of said inner temperature of the vehicle, it is provided carrying out an emergency operation by said emergency system.

In this way it is possible implementing an emergency operation that can save the life of the passenger or of the animal abandoned in the vehicle as a function the inner temperature of the vehicle, so as to advantageously guarantee a greater safety for the passenger or animal abandoned in the vehicle.

Preferably said emergency system comprises a driving unit of one or more windows of the vehicle and said emergency operation comprises lowering and/or raising said one or more windows by said driving unit.

Preferably, provided that said inner temperature of the vehicle is greater than said threshold value of the temperature, said emergency operation comprises lowering said one or more windows by said driving unit. In this way it is possible ensuring an air circulation inside the vehicle so that the inner temperature of the vehicle does not risk causing health damages to the abandoned passenger.

Preferably, provided that said inner temperature of the vehicle is less than said threshold value of the temperature, said emergency operation comprises raising said one or more windows by said driving unit. In this way, it is possible maintaining a temperature inside the vehicle that does not cause the cooling and/or the frostbite of the passenger abandoned in the vehicle.

Preferably said emergency system comprises a centralized opening/closing system of doors of the vehicle and said emergency operation comprises actuating said centralized opening/closing system for unlocking said doors. In this way it is possible intervening so as to simply save the abandoned passenger.

Preferably said anti-abandonment system comprises an ultrasonic sensor placed in a trunk of the vehicle and structured for detecting a movement in the trunk by emission of an ultrasonic acoustic wave and measurement of a respective return time.

Preferably said anti-abandonment system comprises a further laser sensor placed in the trunk of the vehicle next to said ultrasonic sensor and structured for detecting a movement in the trunk by emission of a respective laser beam and measurement of a respective time of flight.

Preferably said further laser sensor has one or more of the features of said at least one laser sensor. In this way, the anti-abandonment system can be simply made.

Preferably it is provided activating an ultrasonic sensor placed in a trunk of the vehicle and a further laser sensor placed in the trunk of the vehicle next to said ultrasonic sensor.

In this way, it is possible detecting a movement of a passenger or animal also in the trunk of the vehicle.

Preferably said command-and-control unit is operatively connected to said ultrasonic sensor and said further laser sensor for receiving respectively a third and a fourth detection signal representative of said movement in the trunk.

Preferably it is provided detecting a movement in the trunk of the vehicle by emission of an ultrasonic acoustic wave and measurement of a respective return time by said ultrasonic sensor and by emission of a respective laser beam and measurement of a respective time of flight by said further laser sensor and generating respectively a third and fourth detection signal representative of said movement in the trunk.

Preferably the command-and-control unit is programmed and configured for:
  processing said third and fourth detection signal for verifying an achievement of a respective further alarm condition;
  provided the achievement of the respective further alarm condition for both said third and fourth detection signal, sending a respective further command signal to said alarm system and opening a tailgate of the trunk of the vehicle.

In this way, it is possible ensuring a high detection reliability also in the trunk of the vehicle, providing a double check for the possible presence of a passenger in the trunk. In fact, the use of the ultrasonic sensor alone could be subject to false alarms, for example in case of transport of the vehicle (e.g., transport on a ship and/or loaded on a tow truck, etc.), since the vibrations undergone by the vehicle could determine the alarm condition for the ultrasonic sensor.

Preferably said emergency system comprises an automatic opening/closing system of a tailgate of the trunk of the vehicle operatively connected to said command-and-control unit for receiving a respective further command signal provided an achievement of a respective further alarm condition for both said third and fourth detection signal.

Preferably said automatic opening/closing system of the tailgate of the trunk is structured for opening the tailgate of the trunk as a function of said receiving said respective further command signal.

In this way it is possible providing an easy way of access for any rescue and/or escape route for the passenger to allow the rescue of the passenger or animal abandoned in the vehicle.

Preferably said emergency system comprises at least two among, more preferably all, said driving unit of one or more windows, said centralized opening/closing system of said doors and said automatic opening/closing system of the tailgate.

Preferably said command-and-control unit is placed in the vehicle, more preferably next to the electronic control unit of the vehicle.

Preferably said command-and-control unit is connected by an electronic connection element to said electronic control unit of the vehicle. In this way, the connection between the command-and-control unit of the anti-abandonment system and the vehicle control unit can be simply made, without directly intervening on the vehicle electronics and avoiding the use of external batteries for powering the anti-abandonment system.

Preferably said activating at least one laser sensor and at least one camera sensor is carried out provided a shutdown of an engine and a shutdown of an electrical panel of said vehicle (e.g., by physically removing the keys from the electrical panel or, in the case of wireless keys, by pressing a button).

Preferably said activating at least one laser sensor and at least one camera sensor is carried out provided a closing of the doors locks of said vehicle (e.g., by actuation of the centralized opening/closing system of the doors) or, in absence of said closing of the doors locks, after a certain time interval after said shutdown of the electrical panel.

Preferably said activating an ultrasonic sensor and a further laser sensor occurs at the same time of said activating at least one laser sensor and at least one camera sensor Preferably it is provided deactivating said anti-abandonment system provided a negative result of said processing of said first and second detection signals (and/or said third and fourth detection signals) for verifying said achievement of said respective (further) alarm condition for a time interval greater than or equal to 30 minutes, more preferably greater than or equal to 60 minutes, from said activating at least one laser sensor and at least one camera sensor (and/or said activating an ultrasonic sensor and a further laser sensor).

DETAILED DESCRIPTION OF SOME EMBODIMENTS OF THE PRESENT INVENTION

The features and advantages of the present invention will be further clarified by the following detailed description of some embodiments, presented by way of non-limiting example of the present invention, with reference to the attached figures.

Figure 1:
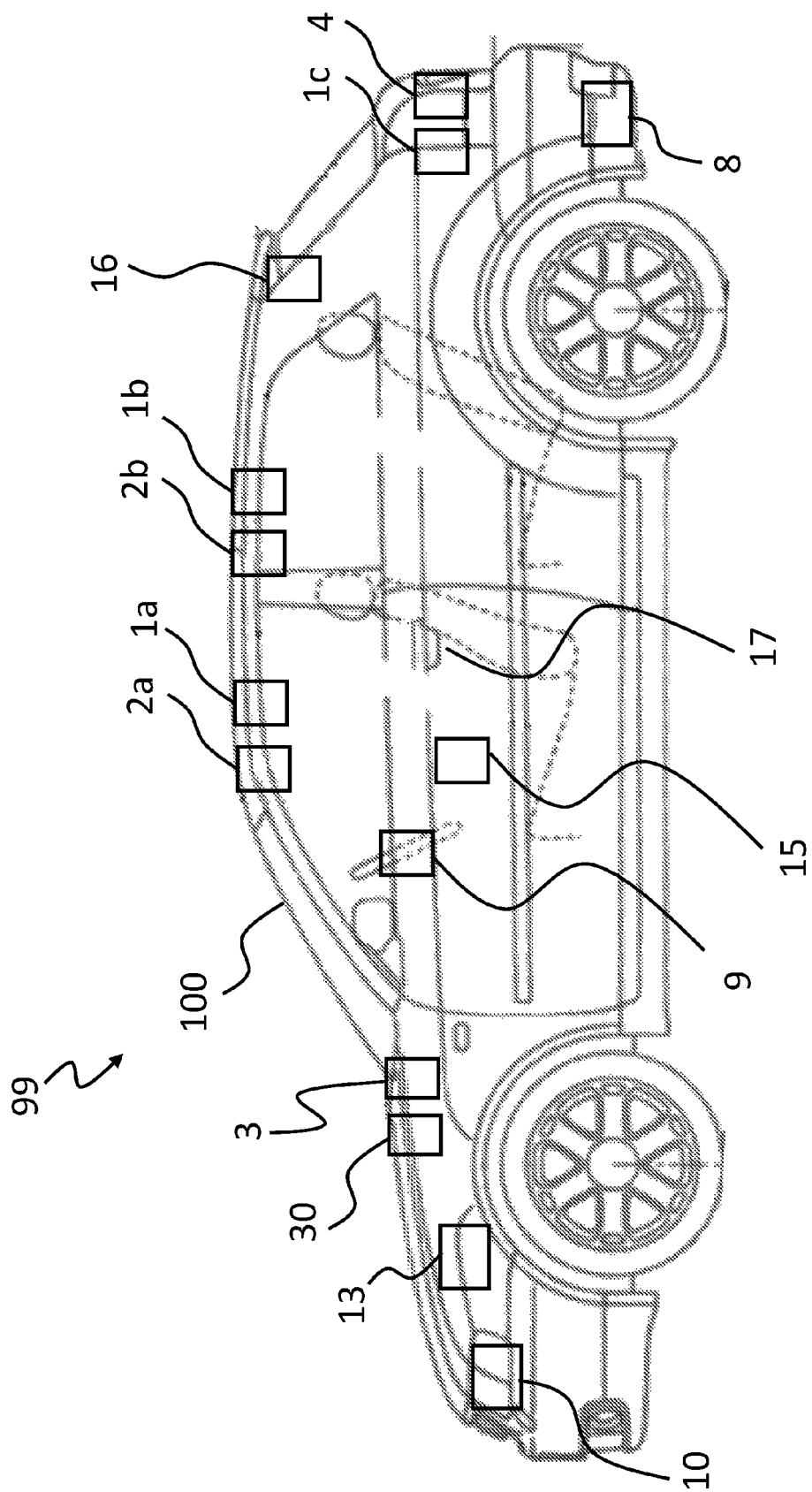
FIG. 1 schematically shows a vehicle with an anti-abandonment system installed on board according to the present invention.

FIG. 1 schematically shows a vehicle 100 having the anti-abandonment system 99 installed on board.

Figure 2:
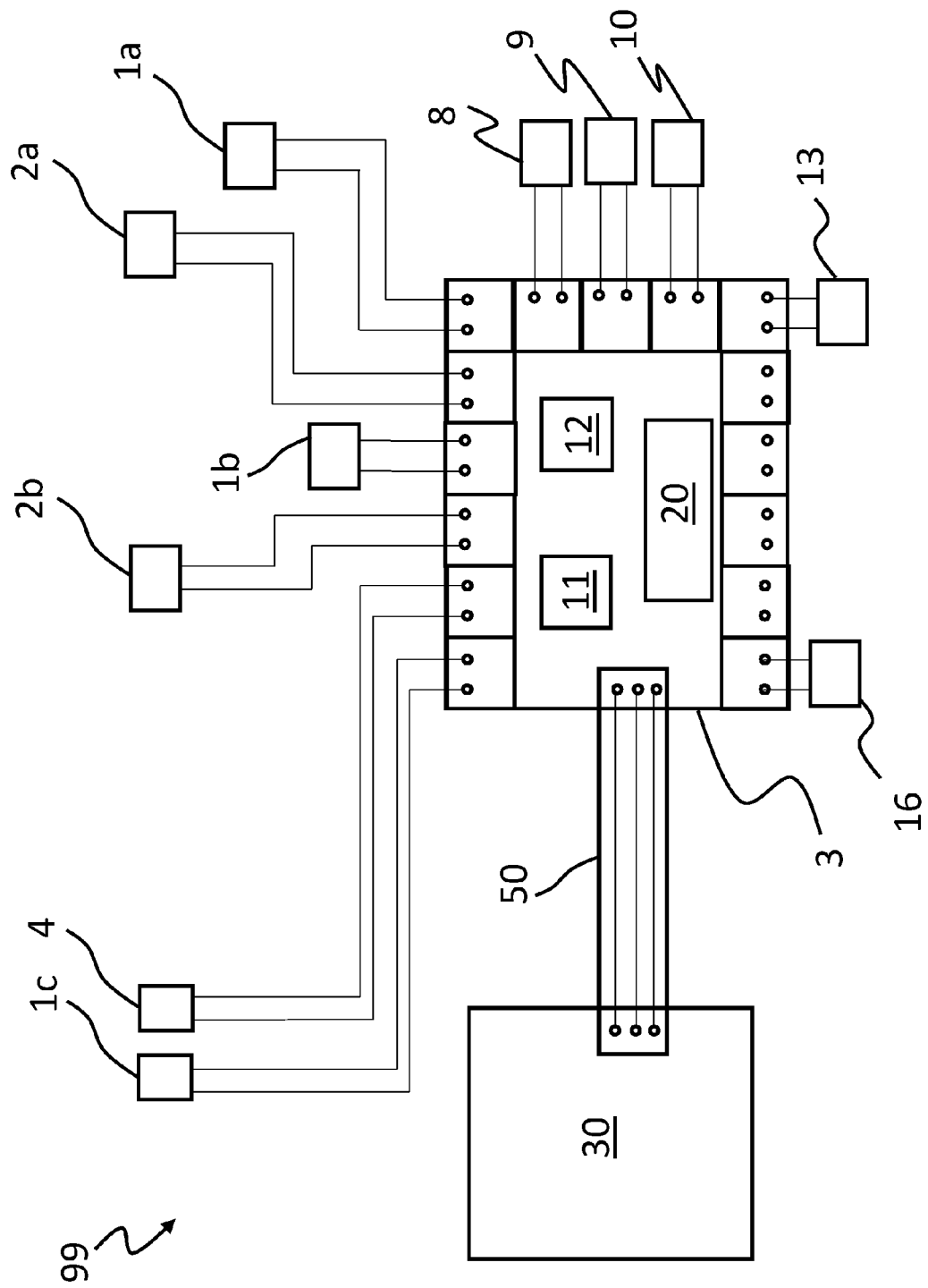
FIG. 2 schematically and by logical blocks shows the anti-abandonment system of FIG. 1

The anti-abandonment system 99 comprises:
- two laser sensors 1a; 1b structured for detecting a movement in the vehicle 100 by emission of a respective laser beam and measurement of a respective time of flight;
- two camera sensors 2a; 2b structured for detecting a movement in the vehicle 100;
- a command-and-control unit 3 operatively connected (as exemplarily shown in FIG. 2) to the two laser sensors 1a; 1b for receiving a respective first detection signal representative of the movement detected by the two laser sensors 1a; 1b, and to the two camera sensors 2a; 2b for receiving a respective second detection signal representative of the movement detected by the two camera sensors 2a; 2b.

Exemplarily one of the two laser sensors 1a is placed at a front portion of a roof of the vehicle 100 (i.e., the ceiling surface facing the passenger compartment), for example at the front seats of the vehicle 100, and the other of the two laser sensors 1b is placed at a central portion of the roof of the vehicle 100, for example at the back seats of the vehicle 100.

Exemplarily the two camera sensors 2a; 2b are respectively placed next to a respective of the two laser sensors 1a; 1b.

Exemplarily each laser sensor 1a; 1b emits a class 1 laser beam.

Exemplarily each laser sensor 1a; 1b has an operating temperature greater than or equal to −30° C. and/or less than or equal to 80° C.

Exemplarily each laser sensor 1a; 1b is a D-TECT LZR laser sensor marketed by HESA S.p.A. or LZR-WIDESCAN laser sensor marketed by the BEA GROUP. In this way, the anti-abandonment system is provided with laser sensors having the appropriate features for ensuring the reliability of the movement detection.

Exemplarily each camera sensor 2a; 2b consists of a camera, for example an IP (Internet Protocol) camera, structured for acquiring images of an inside of the vehicle 100. For example, the IP camera is of the type marketed by Dahua Technology in the 'Lite' or 'Ultra-AI' series, for example the DH-IPC-HDBW2431R-ZAS-S2 model.

Exemplarily each camera 2a; 2b has a resolution equal to 4 mega pixels.

Exemplarily each camera 2a; 2b comprises a processing unit programmed for processing the images of the inside of the vehicle 100 and for detecting the movement inside the vehicle 100 by comparison between images acquired at different time instants, for example the camera has loaded a software of the 'motion detection' type. Such software is for example able to compare subsequent images and evaluate the number of pixels that differ between the images.

Exemplarily each camera 2a; 2b comprises an objective lens and a sensor, for example of the CCD or CMOS type, having for example a size equal to ⅓" which allows obtaining high-definition images.

Exemplarily the sensor is sensitive to the optical radiation and to the infrared radiation.

Exemplarily each camera 2a; 2b comprises a cut-off filter for the infrared radiation.

Exemplarily the cut-off filter for the infrared radiation is alternatively configurable in an activation configuration, for example when the light intensity of the outer environment is greater than or equal to 20 lux, in which it prevents an irradiation of the sensor by the infrared radiation captured by the objective lens, and in an inactivation configuration, for example for light intensity values less than 20 lux, wherein it allows the sensor irradiation.

For example, the cut-off filter for the infrared radiation is configurable by a motor or a magnet able of activating/deactivating the cut-off filter as a function of the light intensity present. For example, both the cut-off filter and the motor/magnet are already incorporated in the camera or they can be separate components from the camera.

Exemplarily each camera 2a; 2b comprises an infrared radiation source, for example 2 LED lamps, for allowing the operation even in total absence of optical radiation and infrared radiation (for example for light intensity values from 5 lux to 0.008 lux), exemplarily activable provided that the cut-off filter is in the deactivation configuration.

For example, the LED lamps can be automatically activated when the light intensity of the environment falls below a certain threshold value, for example 5 lux, or they can be manually activated by an operator using a button provided in the camera body.

In one alternative embodiment, the camera comprises an optical light intensifier, for example a Starlight software. For example, the camera is of the type marketed by Dahua Technology and/or by Reolink Innovation Limited.

Exemplarily the command-and-control unit 3 is placed in the vehicle 100, for example next to an electronic control unit 30 of the vehicle 100.

Exemplarily (as exemplarily shown in FIG. 2) the command-and-control unit 3 is connected by an electronic connection element 50 to the electronic control unit 30 of the vehicle 100.

Exemplarily the anti-abandonment system 99 comprises a temperature sensor 12 structured for continuously detecting an inner temperature of the vehicle 100.

Exemplarily the temperature sensor 12 is integrated in the command-and-control unit 3.

In one not shown embodiment, the temperature sensor is separated from the command-and-control unit and it is placed inside the passenger compartment of the vehicle.

Exemplarily the command-and-control unit 3 is operatively connected to the temperature sensor 12 for receiving a temperature signal representative of the inner temperature of the vehicle 100.

Preferably the anti-abandonment system 99 comprises an alarm system 8; 9; 10; 11; 13 operatively connected (as exemplarily shown in FIG. 2) to the command-and-control unit 3 for receiving a respective command signal and structured for emitting an alarm signal as a function of the receiving the respective command signal.

Exemplarily the alarm system 8; 9; 10; 11; 13 comprises:
- a smoke bomb 8, for example placed next to the exhaust pipe of the vehicle 100, able of emitting coloured smoke;
- a horn 9 of the vehicle 100 able of emitting an acoustic signal, for example a prolonged or intermittent sound for a determined time interval;
- a light 10 of the vehicle 100 able of emitting a light signal, for example a flashing or a turning on of the light 10.

Alternatively, or in addition, it is also possible activating the flashing of a direction indicator of the vehicle;

a telecommunication module 11, exemplarily integrated in the command-and-control unit 3, which for example uses a GSM technology (alternatively the telecommunication module uses a UMTS or LTE or WiMAX technology) for sending a digital message, for example an SMS and/or an email and/or a phone call with a preset recorded message, to one or more receiving devices (e.g., mobile phone, computer and/or tablet);

a small-sized amplifier box 13, for example placed next to the control unit 30 of the vehicle 100, able of emitting a voice message, for example the same message sent by SMS/email/call. For example, the voice message emitted by the amplifier box may have been previously recorded inside the command-and-control unit 3.

Preferably, the anti-abandonment system 99 comprises an emergency system 15; 16; 17 operatively connected (as exemplarily shown in FIG. 2) to the command-and-control unit 3 for receiving a respective command signal and structured for carrying out an emergency operation as a function of receiving the respective command signal and as a function of the inner temperature of the vehicle 100.

Exemplarily the emergency system 15; 16; 17 comprises:

a driving unit 15 of one or more windows of the vehicle 100 for lowering and/or raising the windows;

a centralized opening/closing system 17 of doors of the vehicle 100 for unlocking the doors.

Exemplarily the anti-abandonment system 99 also comprises an ultrasonic sensor 4 placed in a trunk of the vehicle 100 and structured for detecting a movement in the trunk by emission of an ultrasonic acoustic wave and measurement a respective return time.

Exemplarily the anti-abandonment system 99 comprises a further laser sensor 1c placed in the trunk of the vehicle 100 next to the ultrasonic sensor 4 and structured for detecting a movement in the trunk by emission of a respective laser beam and measurement of a respective time of flight.

Exemplarily the further laser sensor 1c is of the same type as the laser sensors 1a and 1b.

Exemplarily the command-and-control unit 3 is operatively connected (as exemplarily shown in FIG. 2) to the ultrasonic sensor 4 and to the further laser sensor 1c for respectively receiving a third and a fourth detection signal representative of the movement in the trunk.

Exemplarily the command-and-control unit 3 is in communication with the aforesaid different types of sensors and systems by a respective communication line, for example with wires.

Exemplarily the command-and-control unit comprises a processor 20.

Exemplarily the command-and-control unit 3, for example the processor 20, is programmed and configured for carrying out the operations according to the present invention, for example as described below.

The anti-abandonment system 99 described above can implement the anti-abandonment method according to the present invention.

First of all, it is provided activating the two laser sensors 1a; 1b and the two camera sensors 2a; 2b.

Exemplarily activating the two laser sensors 1a; 1b and the two camera sensors 2a; 2b is carried out provided a shutdown of an engine of the vehicle 100 and a shutdown of an electrical panel of the vehicle 100.

The shutdown of the engine and of the electrical panel of the vehicle 100 occurs for example by physically removing the keys from the electrical panel or, in the case of wireless keys, by pressing a button.

Exemplarily activating the two laser sensors 1a; 1b and the two camera sensors 2a; 2b is carried out provided a closing of the doors locks of the vehicle, for example by activation of the centralized opening/closing system of the doors, or, in absence of the closing of the doors locks, after a certain time interval (for example equal to 10 minutes) after the shutdown of the electrical panel (in case of wireless keys, provided that the keys are removed).

Exemplarily the ultrasonic sensor 4 and the further laser sensor 1c are simultaneously activated with the two laser sensors 1a; 1b and to the two camera sensors 2a; 2b.

Exemplarily also the inner temperature of the vehicle 100 is continuously detected and the temperature signal representative of the inner temperature of the vehicle 100 is generated.

The two laser sensors 1a; 1b and the two camera sensors 2a; 2b detect any movement in the vehicle 100 respectively by emission of the laser beam and measurement of the respective time of flight and by comparison of subsequent images.

The ultrasonic sensor 4 and the further laser sensor 1c detect any movement in the trunk of the vehicle respectively by emission of the ultrasonic acoustic wave and measurement of the respective return time and by emission of the respective laser beam and measurement of the respective time of flight.

In the following paragraphs, the references to the first and second detection signals are to be understood as relating to the laser sensor 1b and to the camera sensor 2b placed at the back seats of the vehicle. Quite similar considerations apply to the laser sensor 1a and the camera sensor 2a.

At this point, the first detection signal representative of the movement detected by the laser sensor 1b and the second detection signal representative of the movement detected by the camera sensor 2b are generated.

Moreover, the third and fourth detection signals are generated, respectively representative of the movement in the trunk detected by the ultrasonic sensor 4 and by the further laser sensor 1c.

The first and second detection signals are processed for verifying the achievement of the respective alarm condition. The third and the fourth detection signals are also processed for verifying the achievement of the respective further alarm condition.

For example, the alarm condition for the first detection signal can verify when the time of flight measured by the laser beam varies with respect to the value measured at the activation of the laser sensor. Similar considerations apply to both the further laser sensor and the ultrasonic sensor that measures the return time of the emitted ultrasonic acoustic wave.

Exemplarily the alarm condition for the second detection signal verifies when two subsequent images differ from each other by a pixel percentage greater than or equal to a threshold value, for example equal to 1%.

In case the first and second detection signals and/or the third and fourth detection signals do not respectively verify the respective alarm condition and the respective further alarm condition for a time interval, for example, equal to 60 minutes from the activation of the laser sensors (the laser sensor and the further laser sensor), the camera and the ultrasonic sensor, the anti-abandonment system 99 is deactivated.

Provided the achievement of the respective alarm condition for both the first and second detection signal, the following operations are carried out:

the respective command signal is sent to the alarm system which emits the aforesaid alarm signals (e.g., coloured smoke, acoustic signal, flashing of the light, SMS/email, amplified voice message) to warn of the alarm situation in the vehicle 100;

the temperature signal is compared with a threshold value of the temperature;

the respective command signal is sent to the emergency system which carries out the emergency operation according to the temperature inside the vehicle 100.

The emergency operation consists in the operating the centralized opening/closing system 17 for unlocking the vehicle 100 and, depending on whether the inner temperature of the vehicle 100 is higher or lower than the threshold value of the temperature, activating the driving unit 15 for respectively lowering or raising the windows of the vehicle 100.

In case of the achievement of the respective further alarm condition for both the third and fourth detection signals (e.g., the movement is detected inside the trunk of the vehicle), the automatic opening/closing system 16 of the tailgate of the trunk is activated for opening the tailgate of the trunk.

It is noted that the physical distinction between the various electronic devices, such as the command-and-control unit 3, the control unit 30, the laser sensors 1a, 1b and 1c and the cameras 2a and 2b, as regards the functions described above, is purely illustrative. The present invention contemplates any alternative solution in which the carrying out of the described operations takes place in one or more devices differently from as described. For example, one or more of the functionalities of the command-and-control unit, such as receiving and/or processing the detection signals, can be carried out in the same physical device which detects the movement in the vehicle. For example, the command-and-control unit can be physically integrated into the control unit 30.

What is claimed is:

1. An anti-abandonment system in a vehicle, the system comprises:
    at least one laser sensor structured for detecting a movement in the vehicle by emission of a laser beam and measurement of a respective time of flight;
    at least one camera sensor structured for detecting a movement in the vehicle; and
    a command-and-control unit operatively connected to the at least one laser sensor for receiving a first detection signal representative of the movement detected by the at least one laser sensor and to the at least one camera sensor for receiving a second detection signal representative of the movement detected by the at least one camera sensor, the command-and-control unit being configured and programmed for:
        processing the first and second detection signal for verifying an achievement of a respective alarm condition; and
        provided the achievement of the respective alarm condition for both the first and second detection signal, sending a respective command signal to at least one between an alarm system and an emergency system mounted on the vehicle, wherein the alarm system is operatively connected to the command-and-control unit for receiving the respective command signal, wherein the alarm system is structured for emitting an alarm signal as a function of the receiving of the respective command signal, wherein the alarm system comprises a smoke bomb and the alarm signal comprises coloured smoke, wherein the alarm system comprises a telecommunication module and the alarm signal comprises a textual and/or graphic and/or vocal digital message sent to one or more receiving devices by the telecommunication module, wherein the telecommunication module is integrated in the command-and-control unit, wherein the alarm system comprises a horn and/or a light device of the vehicle and the alarm signal comprises respectively an acoustic signal emitted by the horn and/or a light signal emitted by the light device, and wherein the alarm system comprises a vocal amplification system and the alarm signal comprises a vocal message emitted by the vocal amplification system.

2. The anti-abandonment system according to claim 1, wherein the at least one camera sensor comprises a camera structured for acquiring images of an interior of the vehicle, wherein the camera has a resolution greater than or equal to 2 mega pixels and less than or equal to 8 mega pixels, wherein the at least one camera sensor comprises a processing unit programmed for processing the images and for detecting the movement in the interior of the vehicle by comparison between the images acquired at different time instants, wherein the alarm condition for the second detection signal verifies when two subsequent images of the images differ from each other by a pixels percentage greater than or equal to a threshold value, wherein the camera comprises an objective lens and a sensor, wherein the sensor is sensitive to an optical radiation, wherein the sensor is sensitive to an infrared radiation, wherein the at least one camera sensor comprises a cut-off filter for the infrared radiation, and wherein the cut-off filter for the infrared radiation is alternatively configurable in an activation configuration in which it prevents an irradiation of the sensor by the infrared radiation captured by the objective lens, and in an inactivation configuration in which it allows the irradiation of the sensor.

3. The anti-abandonment system according to claim 1, wherein the at least one laser sensor is placed at a roof of the vehicle, wherein the at least one camera sensor is placed next to the at least one laser sensor, wherein the at least one laser sensor emits a class 1 laser beam, wherein the at least one laser sensor has an operating temperature greater than or equal to −30° C. and less than or equal to 80° C., and wherein the command-and-control unit is connected by an electronic connection element to an electronic control unit of the vehicle.

4. The anti-abandonment system according to claim 1, comprising a temperature sensor structured for continuously detecting an inner temperature of the vehicle, wherein the temperature sensor is integrated in the command-and-control unit, wherein the command-and-control unit is operatively connected to the temperature sensor for receiving a temperature signal representative of the inner temperature of the vehicle, wherein the anti-abandonment system comprises the emergency system operatively connected to the command-and-control unit for receiving the respective command signal, wherein the emergency system is structured for carrying out an emergency operation as a function of the receiving the respective command signal and as a function of the inner temperature of the vehicle, wherein the emergency system comprises a driving unit of one or more windows of the vehicle and the emergency operation comprises lowering and/or raising the one or more windows by the driving unit, and wherein the emergency system comprises a centralized opening/closing system of doors of the vehicle and the emergency operation comprises actuating the centralized opening/closing system for unlocking the doors.

5. The anti-abandonment system according to claim 1, comprising an ultrasonic sensor placed in a trunk of the vehicle and structured for detecting a movement in the trunk by emission of an ultrasonic acoustic wave and measurement of a respective return time, wherein the anti-abandonment system comprises a further laser sensor placed in the trunk of the vehicle next to the ultrasonic sensor and structured for detecting a movement in the trunk by emission of a respective laser beam and measurement of a respective time of flight, wherein the command-and-control unit is operatively connected to the ultrasonic sensor and the further laser sensor for receiving respectively a third and a fourth detection signal representative of the movement in the trunk, wherein the emergency system comprises an automatic opening/closing system of a tailgate of the trunk of the vehicle operatively connected to the command-and-control unit for receiving a respective further command signal provided an achievement of a respective further alarm condition for both the third and fourth detection signal, wherein the automatic opening/closing system of the tailgate of the trunk is structured for opening the tailgate of the trunk as a function of the receiving the respective further command signal.

6. A vehicle comprising the anti-abandonment system according to claim 1 installed on board.

7. An anti-abandonment method in a vehicle, the method comprises:
   activating at least one laser sensor and at least one camera sensor placed in the vehicle;
   detecting a movement in the vehicle by means of the camera sensor and by emission of a laser beam and measurement of a respective time of flight by the at least one laser sensor;
   generating a first detection signal representative of the movement detected by the at least one laser sensor;
   generating a second detection signal representative of the movement detected by the at least one camera sensor;
   processing the first and second detection signal for verifying an achievement of a respective alarm condition;
   provided the achievement of the respective alarm condition for both the first and second detection signal, sending a respective command signal to at least one between an alarm system and an emergency system mounted on the vehicle;
   activating an ultrasonic sensor placed in a trunk of the vehicle and a further laser sensor placed in the trunk of the vehicle next to the ultrasonic sensor;
   detecting a movement in the trunk of the vehicle by emission of an ultrasonic acoustic wave and measurement of a respective return time by the ultrasonic sensor and by emission of a respective laser beam and measurement of a respective time of flight by the further laser sensor and generating respectively a third and fourth detection signal representative of the movement in the trunk;
   processing the third and fourth detection signal for verifying an achievement of a respective further alarm condition; and
   provided the achievement of the respective further alarm condition for both the third and fourth detection signal, sending a respective further command signal to the alarm system and opening a tailgate of the trunk of the vehicle.

8. The anti-abandonment method according to claim 7, the method further comprises:
   continuously detecting an inner temperature of the vehicle and generating a temperature signal representative of the inner temperature of the vehicle;
   provided the achievement of the respective alarm condition for both the first and second detection signal, comparing the temperature signal with a threshold value of the temperature;
   provided the achievement of the respective alarm condition for both the first and second detection signal, sending the respective command signal to the alarm system;
   provided the achievement of the respective alarm condition for both the first and second detection signal, sending the respective command signal to the emergency system;
   subsequently to the sending the respective command signal to the alarm system, emitting an alarm signal by the alarm system; and
   subsequently to the sending the respective command signal to the emergency system and as a function of the inner temperature of the vehicle, carrying out an emergency operation by the emergency system.

9. An anti-abandonment system in a vehicle, the system comprises:
   at least one laser sensor structured for detecting a movement in the vehicle by emission of a laser beam and measurement of a respective time of flight;
   at least one camera sensor structured for detecting a movement in the vehicle;
   an ultrasonic sensor placed in a trunk of the vehicle and structured for detecting a movement in the trunk by emission of an ultrasonic acoustic wave and measurement of a respective return time;
   a further laser sensor placed in the trunk of the vehicle next to the ultrasonic sensor and structured for detecting a movement in the trunk by emission of a respective laser beam and measurement of a respective time of flight; and
   a command-and-control unit operatively connected to the at least one laser sensor for receiving a first detection signal representative of the movement detected by the at least one laser sensor, to the at least one camera sensor for receiving a second detection signal representative of the movement detected by the at least one camera sensor, to the ultrasonic sensor and the further laser sensor for receiving respectively a third and a fourth detection signal representative of the movement in the trunk, the command-and-control unit being configured and programmed for:
      processing the first and second detection signal for verifying an achievement of a respective alarm condition; and
      provided the achievement of the respective alarm condition for both the first and second detection signal, sending a respective command signal to at least one between an alarm system and an emergency system mounted on the vehicle, wherein the emergency system comprises an automatic opening/closing system of a tailgate of the trunk of the vehicle operatively connected to the command-and- control unit for receiving a respective further command signal provided an achievement of a respective further alarm condition for both the third and fourth detection signal, wherein the automatic opening/closing system of the tailgate of the trunk is structured for opening the tailgate of the trunk as a function of the receiving the respective further command signal.

10. The anti-abandonment system according to claim 9, comprising a temperature sensor structured for continuously detecting an inner temperature of the vehicle, wherein the temperature sensor is integrated in the command-and-control unit, wherein the command-and-control unit is operatively connected to the temperature sensor for receiving a temperature signal representative of the inner temperature of the vehicle, wherein the anti-abandonment system comprises the emergency system operatively connected to the command-and-control unit for receiving the respective command signal, wherein the emergency system is structured for carrying out an emergency operation as a function of the receiving the respective command signal and as a function of the inner temperature of the vehicle, wherein the emergency system comprises:
- a driving unit of one or more windows of the vehicle and the emergency operation comprises lowering and/or raising the one or more windows by the driving unit; and
- a centralized opening/closing system of doors of the vehicle and the emergency operation comprises actuating the centralized opening/closing system for unlocking the doors.

11. A vehicle comprising the anti-abandonment system according to claim 9 installed on board.

* * * * *